Nov. 29, 1960  A. G. GETZ  2,961,834
SPOT LIGHT AND ADJUSTING MEANS THEREFOR
Filed Dec. 16, 1958  5 Sheets-Sheet 3
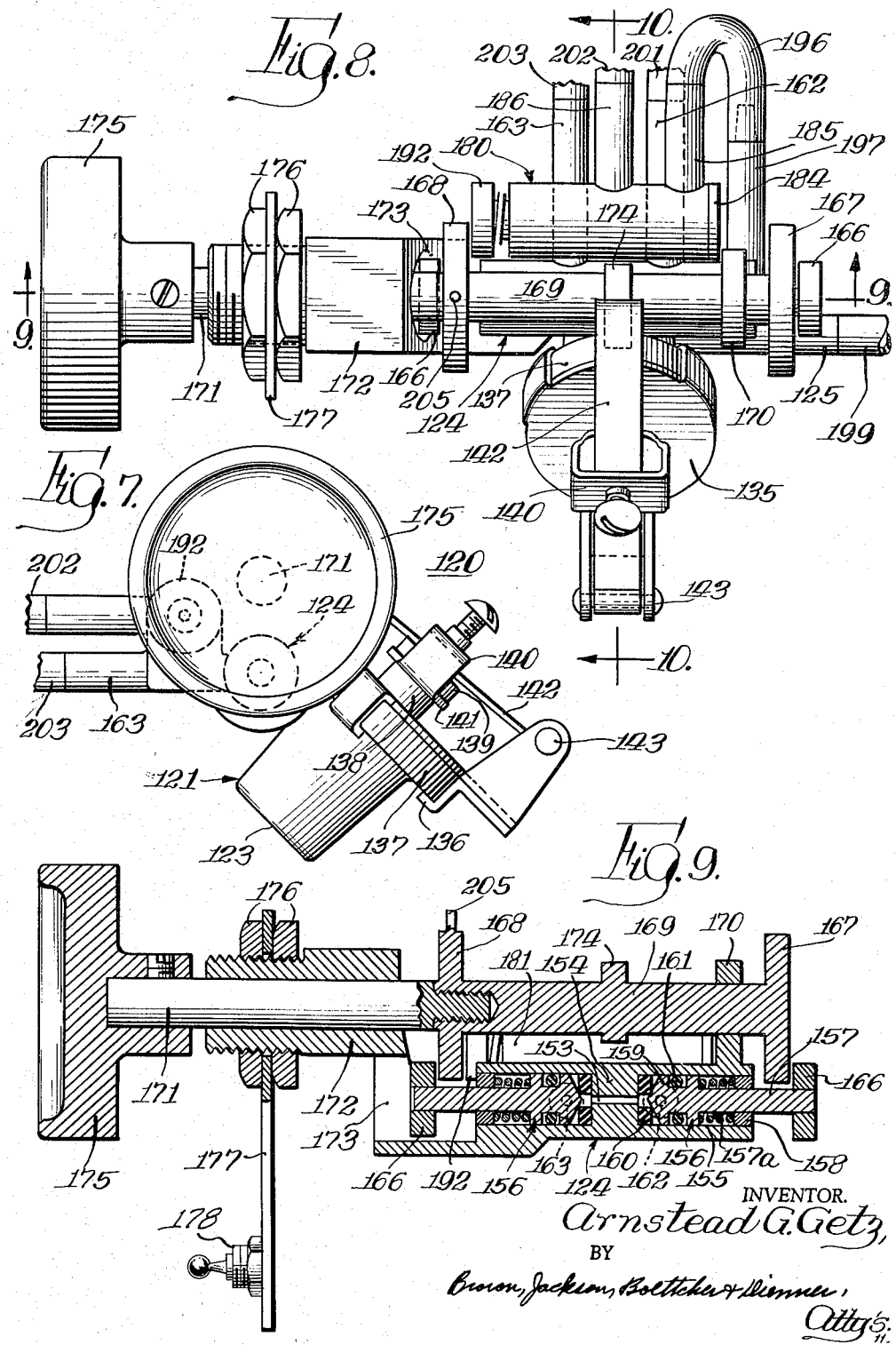
INVENTOR.
Arnstead G. Getz,
BY
Brown, Jackson, Boettcher & Dienner,
Atty's.

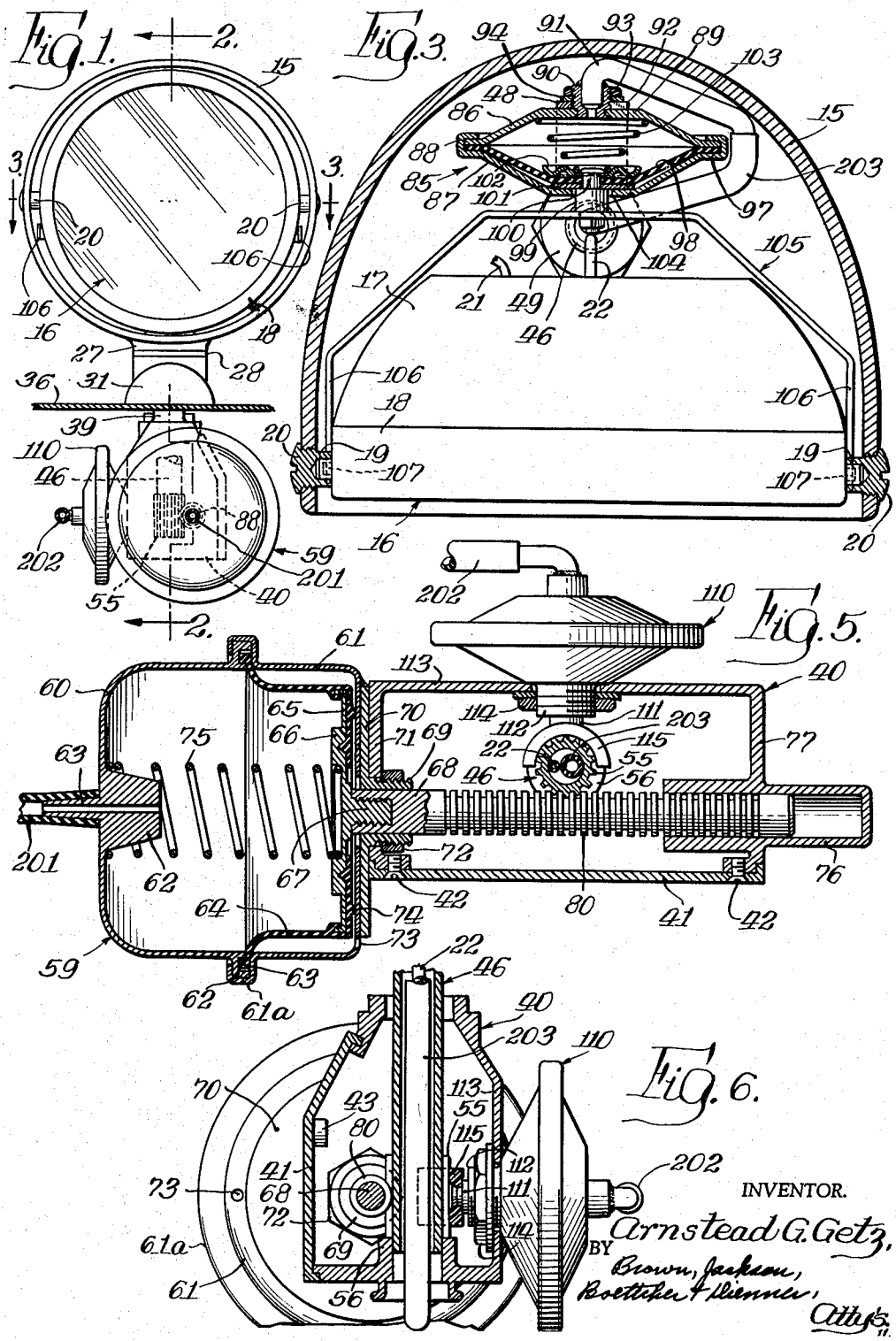

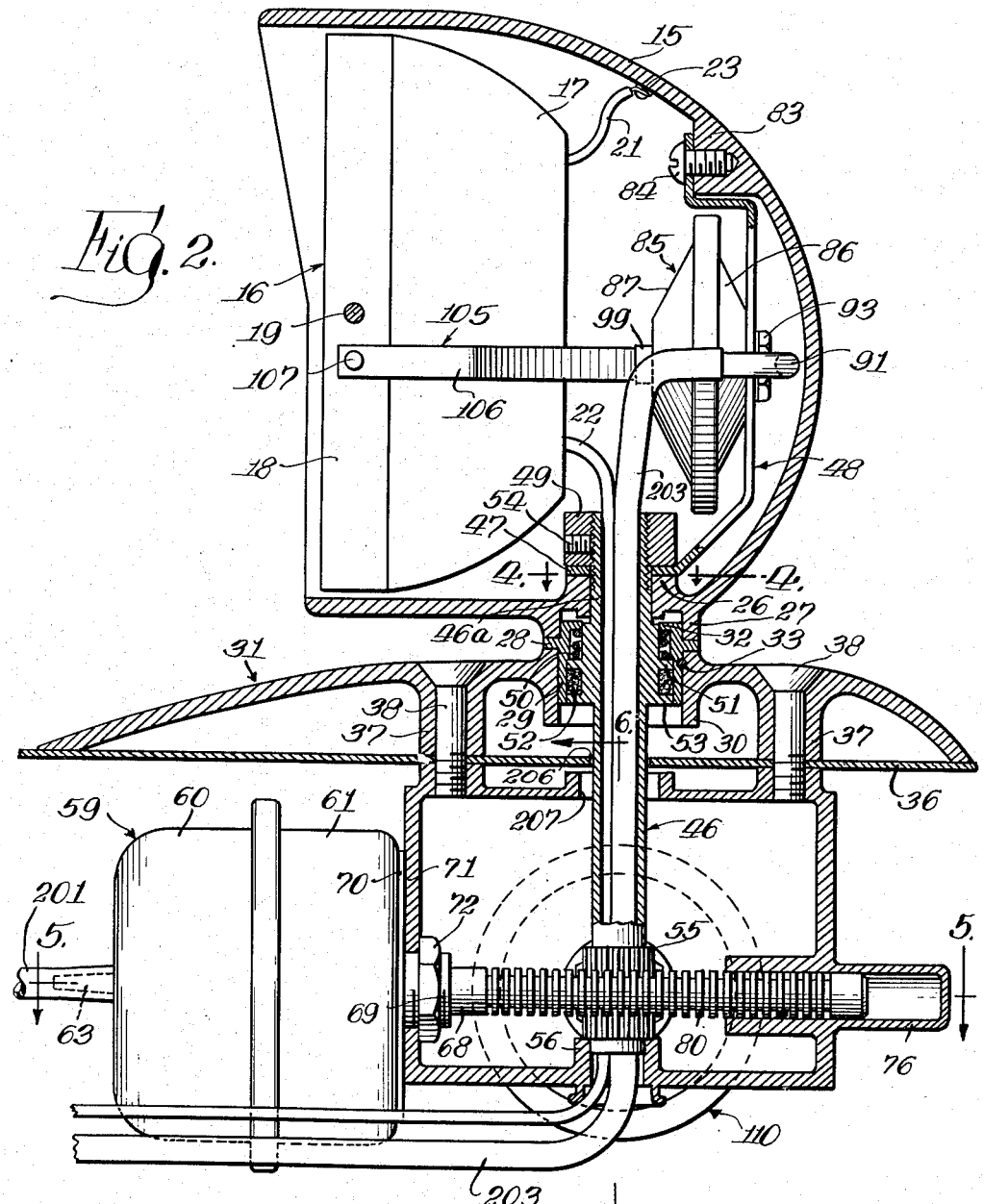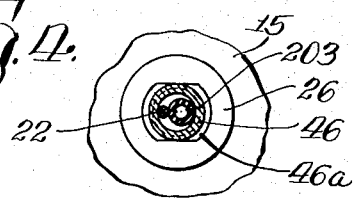

Nov. 29, 1960 A. G. GETZ 2,961,834
SPOT LIGHT AND ADJUSTING MEANS THEREFOR
Filed Dec. 16, 1958 5 Sheets-Sheet 4
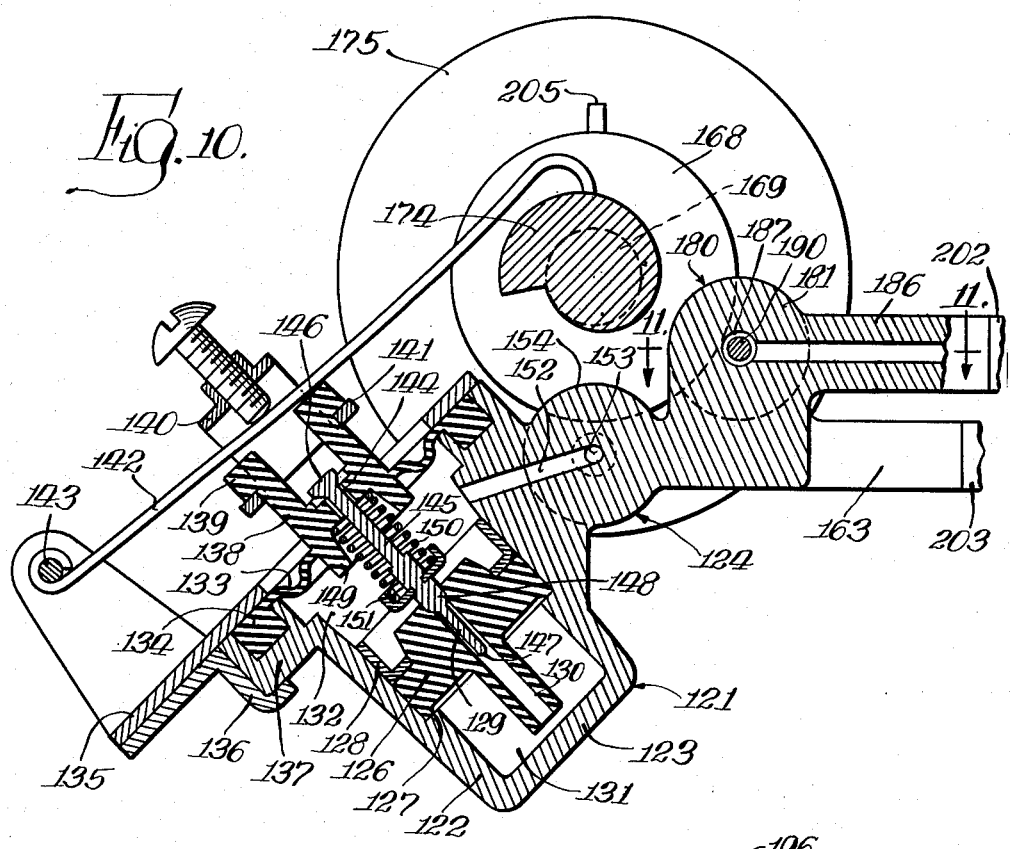
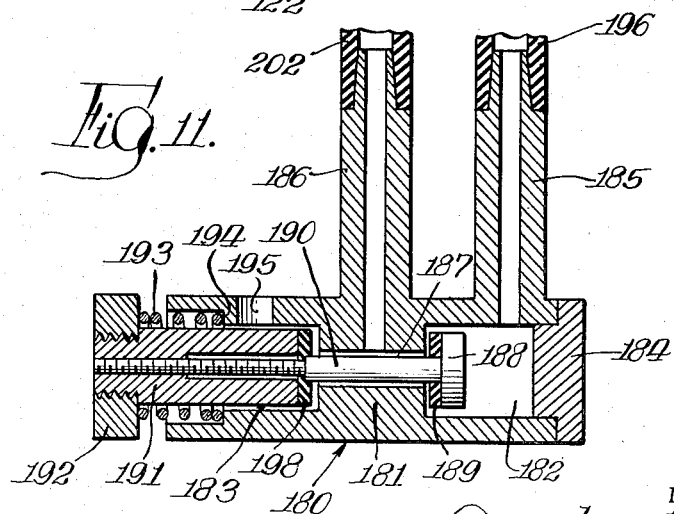
INVENTOR.
Arnstead G. Getz,
BY
Brown, Jackson, Boettcher & Dienner.
Atty's

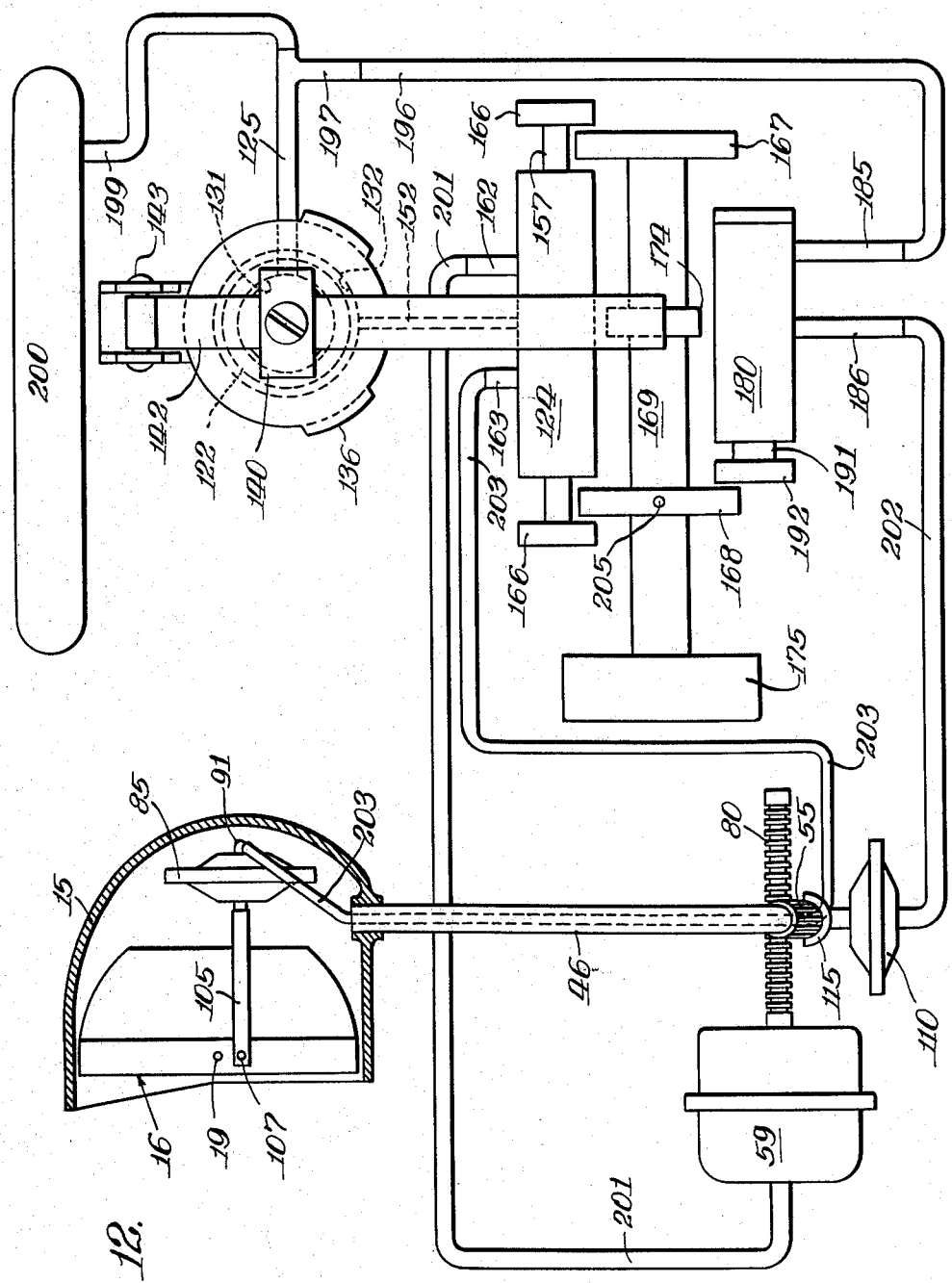

United States Patent Office 2,961,834
Patented Nov. 29, 1960

2,961,834

SPOT LIGHT AND ADJUSTING MEANS THEREFOR

Arnstead G. Getz, Lakewood, Ohio, assignor to The Bishop and Babcock Manufacturing Company, Cleveland, Ohio, a corporation of Ohio Filed Dec. 16, 1958, Ser. No. 780,850

6 Claims. (Cl. 60—97)

This invention relates to remotely controlled means for adjusting spot lights and analogous devices used with automotive vehicles.

Automobile spot lights are well known and extensively used. They commonly are mounted on suitable supports exterior of the automobile body and are adjusted by manually operated means. In one well known form the spot light is rotatably mounted on an arm projecting to one side of the automobile body and is adjusted by manually operated means disposed in position readily accessible to the driver. It is also well known to mount spot lights on the automobile fender, which involves rather complicated and expensive mechanical adjusting means. In general, the known means for adjusting spot lights is manually operated and is rather complex and expensive.

My invention is directed to simple, compact and comparatively inexpensive means for adjusting spot lights and analogous devices. More particularly, my invention provides means whereby the spot light or analogous device may be adjusted to desired extent by power derived from the automobile power plant, such adjustment being accurately controlled by means readily accessible to the driver of the automobile. To that end, I provide suction operated motor means having operating connection to the spot light and connectible by control valve means to a suitable source of suction, such as the automobile intake manifold, the motor means being effective for adjusting the spot light to desired extent and maintaining it in adjustment. While my invention is particularly suitable for adjusting spot lights, in certain respects, in its broader aspects it may be used for adjusting various devices. It will be understood, therefore, that in the following disclosure my invention is shown as used for adjusting a spot light by way of example only and not by way of limitation. Further objects and advantages of my invention will appear from the detail description.

In the drawings:

Figure 1 is a front view of a spot light and adjusting means therefor embodying my invention mounted on the fender of an automobile, the fender being shown fragmentarily and in section;

Figure 2 is a sectional view, on an enlarged scale, taken substantially on line 2—2 of Figure 1, certain parts being shown in elevation;

Figure 3 is a sectional view, on an enlarged scale, taken substantially on line 3—3 of Figure 1, certain parts being shown in plan;

Figure 4 is a fragmentary sectional view taken substantially on line 4—4 of Figure 2;

Figure 5 is an axial sectional view taken substantially on line 5—5 of Figure 2, certain parts being shown in plan;

Figure 6 is a sectional view taken substantially on line 6—6 of Figure 2, certain parts being shown in elevation;

Figure 7 is a side view of the control valve assembly;

Figure 8 is a plan view of the control valve assembly of Figure 7;

Figure 9 is a sectional view taken substantially on line 9—9 of Figure 8, certain parts being shown in elevation;

Figure 10 is a sectional view, on an enlarged scale, taken substantially on line 10—10 of Figure 8, certain parts being shown in elevation;

Figure 11 is a sectional view taken substantially on line 11—11 of Figure 10, certain parts being shown in elevation; and Figure 12 is a diagrammatic view of the spot light adjusting means, including the motors and control valve assembly and the intake manifold and associated parts and the connections therebetween.

Referring to Figures 1 to 3, inclusive, the spot light includes a suitably formed forwardly opening housing 15 within the front of which is disposed a lamp or light unit 16 of suitable known type, preferably one known as a sealed beam unit made by General Electric Company. The unit 16 is provided with two terminal connectors (not shown) appropriately connected to the filament sealed in the unit. I provide the unit 16 with a suitably formed rearwardly extending hood 17 open at its rearward end and secured at its forward end to a ring 18 of angle cross section secured about unit 16. The ring 18 is provided with two diametrically opposite outwardly projecting pins 19 extending into thimble nuts 20 threaded in housing 15 and, in cooperation with pins 19, pivotally supporting hood 17 and unit 16 for adjustment about a horizontal axis extending diametrically thereof. The hood 17 is of generally segmospherical shape and is substantially concentric with the common axis of the pins 19. Two suitably insulated wires or leads 21 and 22 extend through the back of hood 17. Lead 21 is grounded to the housing 15 at 23 and lead 22 is connected to one side of a suitable source of electrical energy, as will be explained more fully later, the other side of which source also is grounded.

The housing 15 is provided at the bottom thereof with a comparatively short upwardly extending collar 26 and with a comparatively short downwardly extending neck 27 coaxial with but of greater interior cross section than collar 26. Neck 27 seats at its lower end on an outwardly extending circumferential flange 28 of a sleeve 29 fitting in and extending upwardly above a neck 30, coaxial with neck 27, of a suitably formed base member 31. The sleeve 29 extends upwardly into neck 27 and is provided, at its upper end, with an inwardly extending circumferential flange 32, for a purpose to be explained presently. The housing 15 is thus mounted for turning movement upon flange 28 and about the upper portion of sleeve 29, as will be clear from what has been said. The sleeve 29 is secured in neck 30 by a lock pin 33 restraining sleeve 29 against turning movement.

The base member 31 seats upon a suitable support, such as a fender 36, and is provided with two downwardly extending tubular bosses 37 passing through corresponding openings in fender 36. Bolts 38 pass through bosses 37 and are threaded into bosses 39 extending from the top of a suitably formed casing 40 having a removable cover 41 secured thereon by screws 42 passing through cover 41 and threaded into ears 43 formed integrally with casing 40 interiorly thereof. The casing 40 is thus removably mounted, by bolts 38, on the fender 34 at the underface thereof, as will be understood from the above.

A tubular shaft or spindle 46, the upper portion of which is of stepped formation, extends through collar 26 and neck 27 of housing 15 and neck 30 of base member 31. The collar 26 is provided with flat surfaces interiorly thereof, providing a substantially rectangular opening, as shown more clearly in Figure 4, and the stepped portion 46a of shaft 46 is slabbed off at opposite sides thereof to conform to such opening. The housing 15 is thus positively connected to shaft 46 for turning movement therewith. The lower arm 47 of a bracket 48, to be later referred to more fully, seats on the upper end of collar 26 and a nut 49 is threaded on the upper end of shaft 46 and seats on arm 47, restraining shaft 46 against downward movement. A compression spring 50, disposed within sleeve 29, is confined between flange 32 and a circumferential flange 51 of shaft 46 and urges the latter downward effective for holding nut 50 seated on arm 47. Flange 51 abouts an interior shoulder of sleeve 29 and in cooperation therewith restrains shaft 46 against upward movement, effectively guarding against any objectionable looseness or play endwise of shaft 46. A sealing ring 52, of felt or any suitable material, is disposed within sleeve 29 and confined between flange 51 and a lower flange 53 of shaft 46 effective for preventing leakage of lubricant about shaft 46. The nut 49 is fixed to shaft 46 in a suitable manner, conveniently by a set screw 54. It will be seen that the shaft 46 and the housing 15 are mounted on base 31 for rotation as a unit about a vertical axis. The lower end portion of shaft 46 is formed to provide a spur pinion 55. The insulated wire or lead 22 extends downward through shaft 46 and through a collar 56 integral with the bottom wall of casing 40 and thence to one side of a suitable source of electrical energy, the other side of which is grounded. The light unit 16 is thus connected in circuit with the source of electrical energy, a suitable switch, to be referred to more fully later, being provided for controlling such circuit.

Turning of the shaft 46 in desired directions is accomplished by means of a suction operated motor 59. Referring to Figure 5, the motor 59 comprises a cylindrical casing formed in two sections, a base section 60 and a cover section 61. The base section 59 is formed as a die casting and is provided, at its outer end, with an inwardly extending boss 62 and a nipple 63 integral therewith and opening into section 59. Section 60 is further provided, at its inner end, with an outwardly extending circumferential flange 62 having in its inner face a channel receiving a relatively thick bead 63 extending circumferentially about the inner end of a cup shaped rubber diaphragm 64. The inner or cover section 61 is formed as a stamping and is provided with an outwardly extending circumferential flange 61a which is bent tightly about flange 62 of section 60 effective for securing the two sections together and for clamping bead 63 of diaphragm 64 tightly in the channel of flange 62 effective for providing an air tight closure between the sections and about the inner end of diaphragm 64. At its outer end diaphragm 64 is molded about a brass disc 65 having a circumferential flange extending axially inward of section 61 and an inner concentric thickened annular portion 66. Disc 65 is further provided with a central outwardly extending screw stud 67 threading into the end of an operating rod 68 slidable through an exteriorly threaded neck 69 of a brass disc 70 secured to the end wall of cover section 61, the latter wall having an opening through which rod 68 extends. The neck 69 of motor 59 extends through end wall 71 of casing 40 and receives a nut 72 threaded thereon and seating on wall 71 for mounting motor 59 thereon. Cover section 61 is provided with an opening 73 whereby that section is open to atmosphere and diaphragm 64 is provided, at its outer end, with rounded protuberances or bumps 74 for spacing it, when fully extended, away from the end wall of section 61. A compression spring 75 is disposed within motor 59 and confined between disc 65 and the outer end of casing section 60, seating about the boss 62.

The operating shaft or plunger 68 of motor 59 extends a substantial distance outward beyond the inner end thereof and is guided in a sleeve 76 coaxial therewith formed integrally with the other end wall 77 of casing 40 and extending both inwardly and outwardly of the latter.

The operating shaft 68 is provided with a plurality of circumferential ribs or teeth 80 meshing with pinion 55, the rod or bar 68 being, in effect, a rack bar meshing with the pinion 55 for rotating the latter. The parts are so adjusted that when the diaphragm 64 of motor 59 is in a position midway between its extreme position in either direction, the housing 15 is in position with the spot light directed straight forward, shown in Figure 2, and the pinion 55 is disposed at the midlength of the ribbed or toothed area of the corresponding operating rod 68, the length of the toothed area of that rod being such that a full stroke thereof in either direction would turn the shaft 46, and with it the housing 15, through somewhat more than 360°. Accordingly, with the parts so disposed, the housing 15 may be turned in either direction through 180° by corresponding movement of the operating rod 68.

I also provide means for tilting the light unit about the axis of pins 19. Referring to Figures 2 and 3, the bracket 48 extends from arm 47 thereof rearward and upward within housing 15 and is secured at its upper end to a boss 83 integral with the upper rear portion of housing 15, by a screw 84. Bracket 48 has a suction operated tilting motor 85 mounted thereon. Referring to Figure 3, motor 85 comprises a base section 86 and a cover section 87 together defining an interior chamber. The base section 86 is of approximately frusto-conical shape and preferably is in the form of a die casting provided at its forward or larger end with an outwardly extending circumferential flange 88 and, at its rearward or smaller end or base with a thickened boss 89 having a central rearwardly extending and exteriorly threaded neck 90 from which extends a reduced nipple 91 opening through neck 90 and boss 89 into the chamber within motor 85. The bracket 48 is provided with a suitably disposed slot 92 which snugly receives neck 90 for mounting motor 85 on bracket 48. A securing nut 93 is threaded on the forward end of neck 90 and seats on a spring washer 94 seating on the rearward face of bracket 48, effective in cooperation with boss 83 for clamping motor 85 in position on bracket 48.

The cover section 87 of motor 85 conveniently is formed as a sheet metal stamping and is bent tightly about flange 88 of base section 86 so as to clamp tightly between flange 88 and a flat comparatively narrow circumferential element 97 of cover section 87 the marginal portion of a diaphragm 98 formed of any suitable material, such as a rubberized fabric. The inner or rearward end portion of plunger or operating rod 99 of motor 85 is reduced in diameter to provide a stud 100 which extends through a flat brass disc 101 seating on the forward face of diaphragm 98 concentric therewith, the center of diaphragm 98 and a corrugated brass disc 102 seating on the inner or rearward face of diaphragm 98, the rearward end of stud 100 being peened over effective for tightly securing rod 99 to diaphragm 98 and tightly clamping the central portion of the diaphragm between the discs 101 and 102. A spiral compression spring 103 is confined between boss 89 of base section 86 and disc 102 with its smaller end or base seating on disc 102 concentric with stud 100. The cover section 87 is provided with an opening 104 of somewhat greater diameter than the rod 99 and through which the latter extends. The operating rod or plunger 99 of motor 85 is secured at its forward end to the center of the bight portion of a yoke 105 of substantially U shape in plan. The arms 106 of yoke 105 extend forward along the sides of hood 17 and ring 18 and are pivoted to the latter, at their forward ends, by studs 107 secured to ring 18. The studs 107 are disposed coaxially, with their common axis a short distance below and parallel with the common axis of the pins 19. When the diaphragm 98 of motor 85 is in its midposition, the light unit 16 is in its vertical position shown in Figures 1 and 2. Normally, the motor 85 is subjected to suction of such value as to hold its diaphragm in midposition, in opposition to compression spring 103, as will be understood from what has been said. Likewise, motor 59 is subjected to suction of proper value to hold its diaphragm in midposition in opposition to compression spring 75, with spur pinion 55 at the midlength of the toothed portion of plunger or operating rod 68 and the spot light directed straight ahead as above stated.

Preferably, though not necessarily, I provide clamping or brake means to guard against possible slight turning of the spot light in any adjusted position about the axis of shaft or spindle 46. To that end I provide a brake motor 110, similar in construction and operation to motor 85 and which, therefore, need not be described in detail. The motor is provided with a plunger 111 slidable through an exteriorly threaded neck 112 which extends through rear wall 113 of casing 40. A nut 114 is threaded on neck 112, at the inner face of wall 113 and clamps motor 110 tightly in position on that wall. The axis of plunger 111 is disposed in the plane of the axis of the spindle or shaft 46. An arcuate shoe 115, formed of "nylon" or other suitable material is secured on the inner end of plunger 111 and extends about the side portion of pinion 55 in proximity thereto and concentric therewith. Normally motor 110 is connected to atmosphere and plunger 111 is held projected, by the compression spring within motor 110, effective for holding shoe 115 in pressure contact with pinion 55 thereby preventing turning of shaft 46 in either direction. By connecting motor 110 to suction and varying the effective suction in the turning motor 59 and the tilting motor 85, the shaft 46 may be released for turning movement and rotated in either direction to desired extent, and the light unit 16 may be tilted in either direction to desired extent, within limits.

Connection of the motors 59 and 85 to suction and to atmosphere, to variable extent, and of motor 110 to suction and to atmosphere, is effected by means of the control valve assembly shown more clearly in Figures 7 to 11, inclusive. The control valve assembly 120 comprises a housing 121, preferably in the form of a die casting and including a cylinder 122 closed at its lower end by an end wall 123, and a barrel 124 integral with cylinder 122 and disposed normal thereto. A nipple 125, integral with cylinder 122, opens into the latter a short distance above end wall 123 and, in practice, is connected to a suitable source of suction, such as the intake manifold of the automobile engine, as will be explained more fully presently. A valve seat member 126, formed of suitable material, such as rubber, seats on an interior circumferential shoulder 127 of cylinder 122 above the opening of nipple 126. A flanged retainer 128, suitably secured in cylinder 122, as by having a push fit therein, seats on the upper marginal portion of valve seat member 126 for retaining it in position within the cylinder. The valve seat member 126 is provided with a central restricted passage 129 extending from its upper face and defined in part by a reduced neck 130 extending downward from member 126, the upper portion of passage 129 being slightly flared or of frusto-conical shape to provide a valve seat. The valve seat member 126 divides the cylinder 122 interiorly into a lower primary suction chamber 131 and an upper air inlet chamber 132 with the passage 129 providing a restriction therebetween.

The air inlet chamber 132 is closed at its upper end by a diaphragm 133 formed of any suitable material, such as rubber, having a thickened downwardly extending circumferential flange 134 seating in a corresponding channel in the upper end of cylinder 122. A bracket 135 seats upon flange 134 and is secured to cylinder 122 by depending fingers 136 bent about flange 137 of cylinder 122 and effective for holding the bracket 135 tightly in position with the flange 134 of diaphragm 133 confined under pressure in the channel of cylinder 122 so as to provide an air tight seal therewith. The diaphragm 133 is provided with a central upwardly extending neck 138 of tubular form having at its upper end an outer circumferential flange 139. A stirrup 140 of substantially inverted U-shape extends upwardly above neck 138 and is provided at its lower end with a ring 141 fitting about neck 138 and beneath flange 139 thereof. A lever 142 is pivoted at 143 on bracket 135, this lever being in the form of a spring steel strip of substantial width. The lever 142 is resilient and provides a yielding connection to neck 138 of diaphragm 133 for moving the latter upward. The neck 138 is tubular, as shown, and is provided with a central opening 144 through which extends a primary valve member 145. The body of valve member 145 is of less diameter than opening 144 and is provided at its upper end with a frusto-conical valve element 146 of materially greater diameter than opening 144 and adapted for cooperation with a valve seat formed in neck 138 and extending upward from opening 144. At its lower end valve member 145 is provided with a reduced downwardly extending finger 147 extending into passage 129 for guiding valve member 145 in its movement and at the upper end of finger 147 the primary valve member 145 is formed to provide a substantially frusto-conical valve element 148 which cooperates with the valve seat at the upper end of passage 129. The tubular neck 149 extends downward from neck 138, as a continuation thereof, and receives the upper end portion of a compression spring 150 disposed about the primary valve member 145 and confined between the lower end of neck 138 and a seat member 151 engaging in a groove in valve member 145. As will be understood from what has been said, when the diaphragm 133 is in its lower position shown in Figure 9, the valve element or head 146 of the primary valve member 145 is spaced an appreciable distance above its seat at the upper end of opening 144, connecting the air inlet chamber 132 to atmosphere and element 148 of valve member 145 is held seated by the compression spring 150 effective for closing the passage 129 and thereby closing the primary suction chamber 131 to the air inlet chamber 132.

The housing 121 is provided with a duct or passage 152 opening from the air inlet chamber 132 into a passage 153 in a central element 154 of barrel 124 and coaxial with the latter. As shown more clearly in Figure 9, the barrel 124 is provided with two secondary chambers 155 extending from each end thereof to the element 154. A valve member 156 is mounted in each of the chambers 155 and is provided with a reduced stem 157 slidable through a plug 158 secured in the outer end of chamber 155 in any suitable manner, conveniently by having a press fit therein. Each of the valve members 156 is provided at its inner end with a substantially frusto-conical head 159 which seats in a valve seat member 160, in the form of a rubber ring seating against the center portion or element 154 of barrel 124 and having an opening aligned with the passage 153. The body portion of valve member 156 is provided with a circumferential groove receiving an O seal ring 161 providing an air tight seal about the valve member, the latter being urged toward seated or closed position by a compression spring 157a disposed about stem 157 and confined between the body of valve member 156 and plug 158. The barrel 124 is further provided (Figures 8 and 9) with two nipples 162 and 163 respectively opening into the secondary chambers 155 adjacent the valve seat members 160. As will be understood from what has been said, when the valve members 156 are in their seated or closed positions shown in Figure 9, the secondary chambers 155 are closed to the air inlet chamber 132.

Stem 157 of each of the secondary valve members 156 is provided at its outer end with a circumferential flange 166. Two discs 167 and 168 are fixed on a shaft 169 rotatably and slidably mounted adjacent one end in an arm 170 extending upwardly from barrel 124 adjacent one end thereof. An operating rod 171 is fixed to the other end of shaft 169 and is slidably and rotatably mounted in a sleeve 172 carried by an arm 173 extending upward from the other end of barrel 124. When the valve members 156 are in their closed positions shown in Figure 9, the discs 167 and 168 are disposed between the ends of barrel 124 and flanges 166 in fairly close proximity to the latter and spaced an appreciable distance from the ends of barrel 124 and the arms 170 and 173, discs 167 and 168 being of such diameter as to extend to within a short distance of the valve stems 157. The lower portion of arm 173 is formed to clear the adjacent flange 166 to accommodate outward movement thereof with its associated valve member 156. By shifting the rod 171 and shaft 169 as a unit endwise in appropriate direction either of the secondary valve members 156 may be opened so as to establish communication between the corresponding secondary chamber 155 and the air inlet chamber 132, as will be clear from what has been said. The shaft 169 is further provided with an eccentric cam 174 fixed thereon at the midlength thereof. A suitable handle or knob 175 is secured on the outer end of rod 171. Sleeve 172 is threaded for a portion of its length, from its outer end, and receives two nuts 176 for mounting the control valve assembly 120 on a supporting bracket 177. A switch 178, of suitable known type, is mounted on bracket 177 and controls the circuit of the light unit 16, as noted above. The cam 174 contacts the downwardly extending free end of lever 142 for adjusting the latter about its pivot 143. When the low point of cam 174 is in contact with lever 142 diaphragm 133 is in its lower position shown in Figure 10 with the air inlet chamber 132 open to atmosphere and closed to the primary suction chamber 131, as previously described.

A second barrel 180 is mounted on barrel 124 parallel with and a short distance above the latter, conveniently formed integrally therewith. Referring to Figure 11, barrel 180 is provided at its midportion with an interior web element 181 of substantial thickness, dividing barrel 180 interiorly into a suction chamber 182 and an air inlet chamber 183. The outer end of suction chamber 182 is closed by a plug 184 secured in that end of barrel 180, the latter having a nipple 185 opening into chamber 182 adjacent the inner face of plug 184. Barrel 180 is provided with a second nipple 186 opening into an axial passage 187 extending through web element 181 from end to end thereof. The end of passage 183 opening into suction chamber 182 is normally closed by a valve member 188 having a rubber facing 189 seating on the corresponding flat end face of web element 181. Stem 190 of valve member 188 is of appreciably less diameter than passage 187 and extends therethrough and through the tubular inner portion of a valve member 191, being threaded into the outer end portion of the latter. A flange or head 192 is secured on the outer end of valve member 191 and a compression spring 193, disposed about the outer portion of member 191, is confined between head 192 and an interior shoulder 194 in barrel 191, which is of increased interior diameter outwardly beyond the air inlet chamber 183. Barrel 180 is further provided with an air inlet port 195 opening into chamber 183 outwardly beyond nipple 186. The portion of valve member 191 extending into chamber 183 is of relatively less diameter providing adequate clearance for free flow of air thereabout. The nipple 185 is connected, by a short length of tubing 196 to a nipple 197 extending from and opening into nipple 125, as is shown more clearly in Figure 8. The nipple 125 is connected to a suitable source of suction, as previously noted, and suction chamber 182 is connected to the same source of suction, as will be understood from the above. The valve member 191 is normally held in its projected position shown in Figure 11, closing nipple 186 to suction chamber 182 and opening it to atmosphere by way of passage 187, chamber 183 and port 195. When the valve member 191 is moved inwardly to closed position, in opposition to spring 193, a rubber sealing ring 198, mounted on the inner end of valve member 191 and fitting tightly about stem 190, seats on the end face of web element 181, effectively closing nipple 186 to atmosphere. Closing of the valve member 191 opens the valve member 188 and connects nipple 186 to the suction chamber 182, for a purpose to be described presently.

In practice, the control valve assembly 120 is mounted in position to be readily accessible to the driver of the automobile, conveniently on the instrument panel. Referring to the diagram of Figure 12, the nipple 125 of cylinder 122 is connected by a conduit 199 to a suitable source of suction, such as the intake manifold 200 of the automobile, nipple 197 is connected by tubing 196 to nipple 185 of barrel 180, as previously noted, nipple 162 of barrel 124 is connected by conduit 201 to nipple 63 of the turning motor 59, nipple 186 of barrel 180 is connected by conduit 202 to the nipple of the locking motor 110, and nipple 163 of barrel 124 is connected to nipple 91 of the tilting motor 85 by a conduit 203, the latter being led upward through shaft 46 as shown in Figure 2.

It may be assumed, for purposes of description, that the motors 59 and 85 are under suction, trapped therein by the sealing valve members 156, of a value to hold the diaphragms of those motors in their midpositions, with the spot light directed straight ahead and the light unit 16 in vertical position, as above, shaft 169 of the control valve assembly 120 being in its normal position shown in Figures 8 and 9. The valve member 191 of barrel 180 is then in its position shown in Figure 11, with the braking or locking motor 110 connected to atmosphere and closed to suction, effective for restraining shaft 46 against turning. In order to turn the spot light in one direction, the operating rod and shaft 169 are moved toward the right, as viewed in Figures 8 and 9. That closes the valve member 191, by means of disc 168 and head 192, thereby closing the locking motor 110 to atmosphere and opening it to suction, effective for retracting plunger 111 of motor 110, thereby releasing shaft 46 for turning. It also opens the sealing valve member 156 for turning motor 59 but does not affect that motor, the diaphragm 64 of which remains in its midposition, because the chamber 132 of cylinder 122 is then closed to both atmosphere and suction as will be explained more fully presently. With the shaft 169 held in its position to the right, it is turned in one direction, clockwise as viewed in Figure 10, for example. That moves the diaphragm 133 outward effective for first seating valve element 146 and thereafter unseating or opening valve element 148. When that occurs motor 59 is connected to suction, by way of passage 129 and chamber 131. The suction in motor 59 is increased correspondingly, effective for retracting operating rod 68 and thereby turning shaft 46 and with it the spot light. The resultant increase in suction in chamber 132 causes the diaphragm 133 to be moved inward by atmospheric pressure until the valve element 148 is seated, thereby closing chamber 132 to chamber 131. The outer valve head or element 146 then remains closed, valve element 148 being then held closed by compression spring 150, with the resilient operating lever 142 slightly deflected and under tension. The extent of turning of the spot light is determined by the extent of turning of shaft 169, as will be understood. When the spot light has been turned to desired extent, rod 171 and shaft 169 are returned as a unit to their normal position endwise. The sealing valve member 156 for the turning motor 59 then closes, trapping the partial vacuum or suction therein, to guard against possible leakage of air, or suction, to motor 59 in the event either of the valve elements 146 and 148 is not tightly closed due to the presence of particles of foreign substances or other causes. Ordinarily, the suction effective in motor 59, in cooperation with the opposing pressure of spring 75, suffices to hold shaft 46 at the desired angular adjustment, but at the midposition of the diaphragm 64 of that motor there may be a tendency, under unfavorable conditions, for shaft 46 to turn slightly. That is guarded against by providing the braking or locking motor 110. As will be understood from the above, the motor 110 is connected to atmosphere and thereby disabled, during adjustment or turning of the spotlight. Upon completion of that operation, with return of shaft 169 to its normal position lengthwise, motor 110 is again closed to suction and opened to atmosphere and is then effective for holding shaft 46 against turning movement, as previously explained. If it is desired to turn the spotlight in the opposite direction, rod 171 and shaft 169 are moved to the right, as before, and the shaft 169 is turned counter-clockwise, it being remembered that both of the valve elements 146 and 148 are then closed, as has been explained above. That releases the outward pull on diaphragm 133 which then is moved inward by atmospheric pressure, due to the suction then obtaining in chamber 132. Such inward movement of diaphragm 133 opens the valve element 146 thereby opening chamber 132 to atmosphere. Air is thus bled to turning motor 59 reducing the effective suction therein and causing operating rod 68 to be projected, by the action of spring 75, to corresponding extent thereby turning the spot light in such opposite direction. During such turning movement of the spot light the inner valve element is held seated by spring 150, then under increased compression. The suction in chamber 132 decreases as air enters that chamber, until the diaphragm 133 moves outward, under the influence of the spring lever 142, supplemented to some extent by spring 150, closing the outer valve element 146. Conditions then become stabilized and the shaft 46 remains in its adjusted position. After the desired adjustment of shaft 46 has been made, rod 171 and shaft 169 are returned to their normal position endwise and locking motor 110 is again enabled for locking shaft 46 in adjustment, the sealing valve member 156 for motor 59 being then returned to its normal closed position. The extent of turning of shaft 46 in the opposite direction last mentioned is, as before, determined by the extent of counter-clockwise turning of shaft 169. Preferably, but not necessarily, a pin 205 is secured in disc 168 and is disposed to contact the stem of the left hand, as viewed in Figure 9, sealing valve member 156, to prevent turning of shaft 169 more than a complete revolution in either direction. The operating lever 142 is of substantial width, as previously mentioned, adequate to assure effective contact thereof with cam 174 in either extreme endwise position of shaft 169, limited by the heads or flanges 167 on stems 157 of the sealing valve members 156.

In order to tilt the light unit 16, rod 171 and shaft 169 are moved toward the left, as viewed in Figure 10, opening the sealing valve member 156 for the tilting motor 87, and the shaft 169 is turned to an appropriate extent in the proper direction. Turning shaft 169 clockwise, as viewed in Figure 10, connects motor 85 to suction, as above described in respect to the turning motor 59, thereby retracting plunger 99 of motor 85 and tilting unit 16 downward about the axis of studs 107. Turning shaft 169 counter-clockwise bleeds air to motor 85 and plunger 99 thereof is then projected by spring 103, effective for tilting unit 16 upward. The extent of tilting of unit 16 in either direction is determined by the extent of turning of shaft 169. When unit 16 has been adjusted to desired extent, operating rod 171 and shaft 169 are returned to their normal position endwise, and the seal valve member 156 for motor 85 closes, sealing it closed to both atmosphere and suction. During tilting movements of unit 16 diaphragm 98 of motor 85 permits rocking or tilting of plunger 99, accommodated by opening 104 providing adequate clearance for that purpose. Endwise movement of rod 171 and shaft 169, for adjusting unit 16 as above does not affect the locking motor 110, which remains open to atmosphere effective for restraining shaft 46 against turning movement in either direction.

The spot light and associated adjusting means therefor may be mounted at any suitable location, within the broader aspects of my invention, but preferably is mounted on the fender 36 as shown and above described. Preferably, though not necessarily, the housing 40 and the parts mounted thereon are mounted as a unit beneath the fender 36, by means of the bolts 38, the latter also serving to secure base member 31 on the fender 36. Thereafter, the housing 15 with the parts mounted therein, including the shaft 46 and sleeve 29 and associated parts, is mounted as a unit on base 31. To that end, fender 36 is provided with an opening 206 of slightly greater diameter than pinion 55, aligned with an opening 207 of equal diameter in the top wall of housing 40. The openings 206 and 207 are coaxial with each other and with neck 56 at the bottom of housing 40 and, also, with shaft 46 in the complete assembly. The shaft 46 is inserted downward through openings 206 and 207 to position with flange 28 of sleeve 29 seating on the upper end of neck 30 of base 31 and pinion 55 meshing with teeth or ribs 80 of operating rod 68 of the turning motor 59. When the parts have been properly positioned, the locking pin 33 is inserted and is effective for sleeve 29 against upward movement relative to neck 30 as well as restraining sleeve 29 against turning movement as previously stated.

It will be understood, as above indicated, that changes in detail may be resorted to without departing from the field and scope of my invention, and I intend to include all such variations as fall within the scope of the appended claims, in this application in which the preferred form only of my invention has been disclosed.

I claim:

1. In means for operating a device carried by and turnable with a shaft mounted for rotation in opposite directions about a first axis and mounted on said shaft for relative tilting movement in opposite directions about a second axis substantially perpendicular to said first axis, said operating means comprising a first suction operated turning motor having operating connection to said shaft, a second suction operated tilting motor for tilting said device about said second axis, a suction source, and control valve means connected to said motors effective for selectively and independently connecting said motors to said suction source to variable extent.

2. In means for operating a device carried by and turnable with a shaft mounted for rotation in opposite directions about a first axis and mounted on said shaft for relative tilting movement in opposite directions about a second axis substantially perpendicular to said first axis, said operating means comprising a pinion fixed on said shaft, two suction operated motors each having a diaphragm and a plunger movable thereby in opposite directions, one of said motors being a turning motor and having its plunger provided with a rack bar meshing with said pinion, the other of said motors being a tilting motor with its plunger adapted for operating connection to said device, a suction source, and control valve means connected to said motors effective for selectively and independently connecting said motors to said suction source to variable extent.

3. In means for operating a device carried by and turnable with a shaft mounted for rotation in opposite directions about a first axis and mounted on said shaft for relative tilting movement in opposite directions about a second axis substantially perpendicular to said first axis, said operating means comprising a pinion fixed on said shaft, two suction operated motors each having a diaphragm yieldingly urged in one direction and movable in the opposite direction by suction, one of said motors being a turning motor and having its plunger provided with a rack bar meshing with said pinion, the other of said motors being a tilting motor with its plunger adapted for operating connection to said device, a suction source, and control valve means connected to said motors effective for selectively and independently connecting said motors to said suction source to variable extent.

4. In means for operating a device carried by and turnable with a shaft mounted for rotation in opposite directions about a first axis and mounted on said shaft for relative tilting movement in opposite directions about a second axis substantially perpendicular to said first axis, said operating means comprising a first suction operated turning motor having operating connection to said shaft, a second suction operated tilting motor for tilting said device about said second axis, braking means normally restraining said shaft against turning comprising a third suction operated motor, a suction source, and control valve means connected to said motors normally closing said first and second motors to suction and opening said third motor to atmosphere, said control valve means being adjustable for selectively and independently connecting said first and second motors to suction to variable extent and connecting said third motor to suction incident to connection of said first motor to suction and effective for disabling said braking means preliminary to connecting said first motor to suction.

5. In means for operating a device carried by and turnable with a shaft mounted for rotation in opposite directions about a first axis and mounted on said shaft for relative tilting movement in opposite directions about a second axis substantially perpendicular to said first axis, said operating means comprising a first and a second and a third suction operated motor, said suction motors respectively comprising a movable wall yieldingly urged in one direction and moved in the opposite direction responsive to suction and a plunger attached to said wall movable thereby to projected position and retracted position in the movement of said wall in said one direction and in said opposite direction respectively, the plunger of said first motor having operating connection to said shaft and the plunger of said second motor being for tilting said device, means on the plunger of said third motor cooperating with said shaft for restraining the latter against turning when said third motor plunger is projected and releasing said shaft for turning when said third motor plunger is retracted, a suction source, and control valve means connected to said motors normally effective for closing said first and second motors to suction and opening said third motor to atmosphere, said control valve means being adjustable for selectively and independently connecting said first and second motors to suction and to atmosphere to variable extent and connecting said third motor to suction incident to connection of said first motor to suction.

6. In means for operating a device carried by and turnable with a shaft mounted for rotation in opposite directions about a first axis and mounted on said shaft for relative tilting movement in opposite directions about a second axis substantially perpendicular to said first axis, said operating means comprising a first suction operated turning motor having operating connection to said shaft, a second suction operated tilting motor for tilting said device about said second axis, braking means normally restraining said shaft against turning movement comprising a third suction operated motor, a suction source, and control valve means connected to said motors normally closing said first and second motors to suction and opening said third motor to atmosphere, said control valve means being adjustable effective for selectively and independently connecting said first and second motors to suction to variable extent and for connecting said third motor to suction effective for disabling said braking means preliminary to connecting said first motor to suction.

References Cited in the file of this patent

UNITED STATES PATENTS

| | | |
|---|---|---|
| 1,012,457 | Severson | Dec. 19, 1911 |
| 1,256,284 | Arbuckle | Feb. 12, 1918 |
| 1,398,292 | Arbuckle | Nov. 29, 1921 |
| 1,678,495 | Bergman | July 24, 1928 |
| 1,794,166 | Gehrig | Feb. 24, 1931 |
| 1,913,874 | Folberth et al. | June 13, 1933 |
| 2,390,634 | Aufiero | Dec. 11, 1945 |
| 2,734,997 | Frady | Feb. 14, 1956 |
| 2,906,098 | Mayo | Sept. 29, 1959 |
| 2,921,183 | Fenn et al. | Jan. 12, 1960 |